H. DECKER.
WAGON-BRAKE.
No. 169,969.
Patented Nov. 16, 1875.
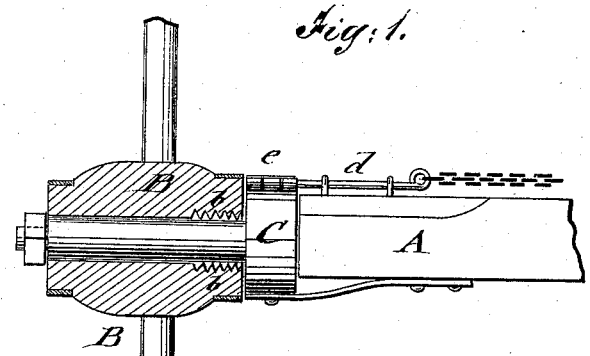
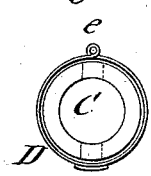
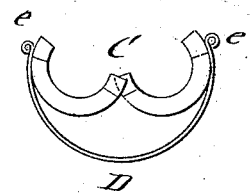
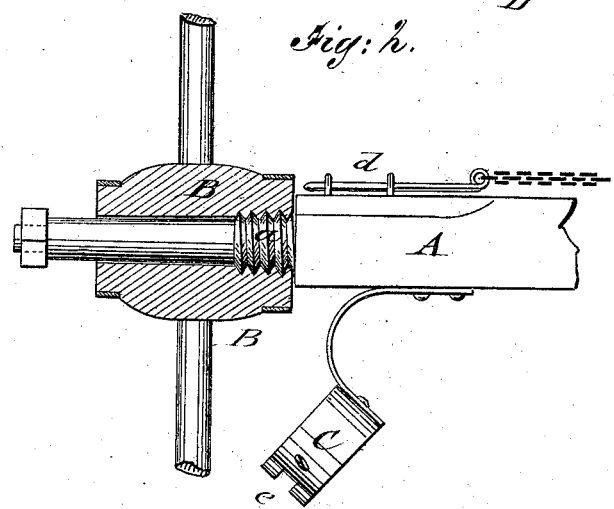
WITNESSES:
Chas. Nida
Alex F. Roberts
INVENTOR:
H. Decker
BY Munn & Co
ATTORNEYS.

UNITED STATES PATENT OFFICE.

HENRY DECKER, OF ORANGE, NEW JERSEY.

IMPROVEMENT IN WAGON-BRAKES.

Specification forming part of Letters Patent No. 169,969, dated November 16, 1875; application filed October 23, 1875.

*To all whom it may concern:*

Be it known that I, HENRY DECKER, of Orange, in the county of Essex and State of New Jersey, have invented a new and Improved Safety-Brake for Vehicles, of which the following is a specification:

In the accompanying drawing, Figures 1 and 2 represent sectional side views of an axle with my improved safety-braking device, shown before and after the same is thrown into action, and Figs. 3 and 4 are side views of the spring-collar in closed and open position, on the release of which the brake action is produced.

Similar letters of reference indicate corresponding parts.

My invention relates to an improved safety-brake for vehicles of all kinds, which may be readily thrown into action for effectively locking the wheels to the axles in case of accidents by the frightening of the horses, breaking of the common brake-shoe, or other causes.

The invention consists of the axle of the vehicle being provided at the ends with a short screw-thread, from which the hub of the wheel is separated by a spring-collar that is locked by a suitable device until released by mechanism from the driver's seat. The detaching of the spring-collar causes the screwing up of the interior threaded hub on the screw-thread of the axle until the rigid position of the wheel is produced.

In the drawing, A represents the axle of any vehicle, and B the hub of the wheel, which revolves in the usual manner on the round journal end of the axle. The journal end of the axle A is made somewhat longer than the width of the hub, for the purpose of admitting the construction on the same, at the part adjoining the square end of the axle, of a male screw-thread, $a$, over which a spring-collar, C, of the same width is applied, to keep the hub together with the outer nut in regular position for revolving on the round end of the axle. The inner part of the hub B is provided with a female screw-thread, $b$, that fits exactly on the thread of the axle end when the spring-collar is detached.

The spring-collar C is made of two hinged semi-sections, which are connected by a band-spring, D, and closed rigidly by a pin, $d$, or other retaining device, sliding on the axle and entering staples or sleeves $e$ of the spring or collar.

The locking-pin, which keeps the spring-collar closed around the threaded axle part, is connected by chain, lever, wire-rope, or other suitable mechanism, to a treadle or handle at the driver's seat or other part of the vehicle, so that by withdrawing the fastening-pins the spring-collars of the wheels may be simultaneously detached from the axles.

The spring-collar is also connected to the axle by a band-spring or other device, for preventing the loosing of the collar on releasing the same.

The collar-surrounding spring D may be dispensed with when the collar is applied by a band-spring to the axle, as the action of the same on the withdrawal of the closing device would also instantly release the collar. As soon as the collars are released the hubs begin to screw up on the shaft until locked rigidly thereto, so that a positive brake action of the same is obtained, and thereby the vehicle brought soon to a stop in case of accident.

For placing the device in readiness for renewed brake action, the hubs have to be unscrewed from the axles and the collars have to be reattached; thus, an instant-acting and reliable safety-braking device for vehicles is obtained, which may be applied without too great expense.

Having thus described my invention, I claim as new and desire to secure by Letters Patent—

1. The combination, with the axle of a vehicle having a threaded section at the junction of the square part and journal end of the same with an interior-threaded wheel-hub for screwing up on the axle when allowed to pass on the threaded portion of the same, substantially in the manner and for the purpose set forth.

2. The combination of a vehicle-axle having a threaded portion of the journal end adjoining the square part of the axle, with a spring-collar secured around the same, and with the hub of the wheel, substantially as and for the purpose set forth.

3. The combination of the spring-collar encircling the threaded portion of the journal end of the axle with a locking device and releasing mechanism for detaching the collar, and producing brake-action of wheel by screwing up of wheel-hub, substantially as shown and described.

HENRY DECKER.

Witnesses:
 EUGENE FIESTER,
 AUGUST F. ECKERT.